(12) United States Patent
Patel et al.

(10) Patent No.: US 11,245,312 B2
(45) Date of Patent: Feb. 8, 2022

(54) HIGH SPEED GENERATOR CONNECTION ASSEMBLY

(71) Applicant: Hamilton Sundstrand Corporation, Charlotte, NC (US)

(72) Inventors: Dhaval Patel, Loves Park, IL (US); Edward C. Allen, Davis, IL (US); Andrew R. Wilkinson, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 291 days.

(21) Appl. No.: 16/456,369

(22) Filed: Jun. 28, 2019

(65) Prior Publication Data

US 2020/0412210 A1 Dec. 31, 2020

(51) Int. Cl.
| | |
|---|---|
| *H02K 11/00* | (2016.01) |
| *H02K 11/042* | (2016.01) |
| *H02K 11/04* | (2016.01) |

(52) U.S. Cl.
CPC ......... *H02K 11/042* (2013.01); *H02K 11/046* (2013.01); *H02K 11/04* (2013.01)

(58) Field of Classification Search
CPC ........ H02K 11/042; H02K 11/00; H02K 7/00; H02K 11/02; H02K 11/04; H02K 9/00; H02K 11/0094; H01C 13/02; H01C 1/02; H02M 7/00; F16B 2/20; H01R 4/48
See application file for complete search history.

(56) References Cited

U.S. PATENT DOCUMENTS

| | | | |
|---|---|---|---|
| 5,065,484 A | 11/1991 | Pinchott | |
| 7,586,224 B2 * | 9/2009 | Osborn | H02K 11/042 310/68 D |
| 9,035,508 B2 | 5/2015 | Grosskopf et al. | |
| 9,312,742 B2 * | 4/2016 | Grosskopf | H01R 4/48 |
| 2007/0013243 A1 * | 1/2007 | Lacaze | H02K 19/38 310/68 D |
| 2010/0283357 A1 * | 11/2010 | Lemmers, Jr. | H02K 11/042 310/68 D |
| 2013/0300231 A1 | 11/2013 | Grosskopf et al. | |
| 2014/0226383 A1 * | 8/2014 | Brust | H02K 11/046 363/126 |

FOREIGN PATENT DOCUMENTS

EP   2773031 A2   9/2014

OTHER PUBLICATIONS

European Search Report for EP Application No. 19215714.7 dated Jun. 26, 2020.

* cited by examiner

*Primary Examiner* — Tran N Nguyen
*Assistant Examiner* — Leda T Pham
(74) *Attorney, Agent, or Firm* — Carlson, Gaskey & Olds, P.C.

(57) ABSTRACT

A rotor pack for a generator has an exciter rotor rotating with a shaft. A rectifier assembly is in electric communication with the exciter rotor to receive AC current and rectify the AC current into a DC voltage. Positive and negative busses extend from the rectifier assembly to a negative rail and a positive rail on a connection assembly. The negative rail is in contact with the shaft to provide a ground connection. The negative and positive rails are formed of a metal. The negative and positive rails are connected to a main field winding. A high speed generator is also disclosed.

18 Claims, 6 Drawing Sheets

HIGH SPEED GENERATOR CONNECTION ASSEMBLY

BACKGROUND

This application relates to a high speed generator.

Generators are known and typically have an input shaft connected to a source of rotation. The input shaft rotates when driven by the source of rotation causing a main field winding to rotate adjacent to a stator. Electrical energy is generated in the stator from the rotation of the main field winding.

A DC voltage is supplied to the field winding. In known generators, an exciter stator is positioned adjacent an exciter rotor and transmits AC three phase current to a rectifier assembly. The rectifier assembly rectifies the three phase AC current into a DC current. A positive bus and a negative bus extend from the rectifier assembly into positive and negative rails associated with a connection assembly. The connection assembly communicates the DC voltage through negative and positive connection to the main field winding. The connection assembly further includes a resistor to eliminate any undesirable effects on the transmitted DC voltage.

In the past, the connection assembly has utilized beryllium copper elements as both the positive and negative rails. The rails connect to terminal connections that extend radially outwardly to be connected to the main field winding. The terminal connections have an inner tang extending into a spring clip associated with the positive and negative rails. The spring clips sit in members formed of a plastic. In addition, a suppression resistor is included as well as a high impedance resistor.

SUMMARY

A rotor pack for a generator has an exciter rotor rotating with a shaft. A rectifier assembly is in electric communication with the exciter rotor to receive AC current and rectify the AC current into a DC voltage. Positive and negative busses extend from the rectifier assembly to a negative rail and a positive rail on a connection assembly. The negative rail is in contact with the shaft to provide a ground connection. The negative and positive rails are formed of a metal. The negative and positive rails are connected to a main field winding.

A high speed generator is also disclosed.

These and other features may be best understood from the following drawings and specification.

DETAILED DESCRIPTION

Figure 1:
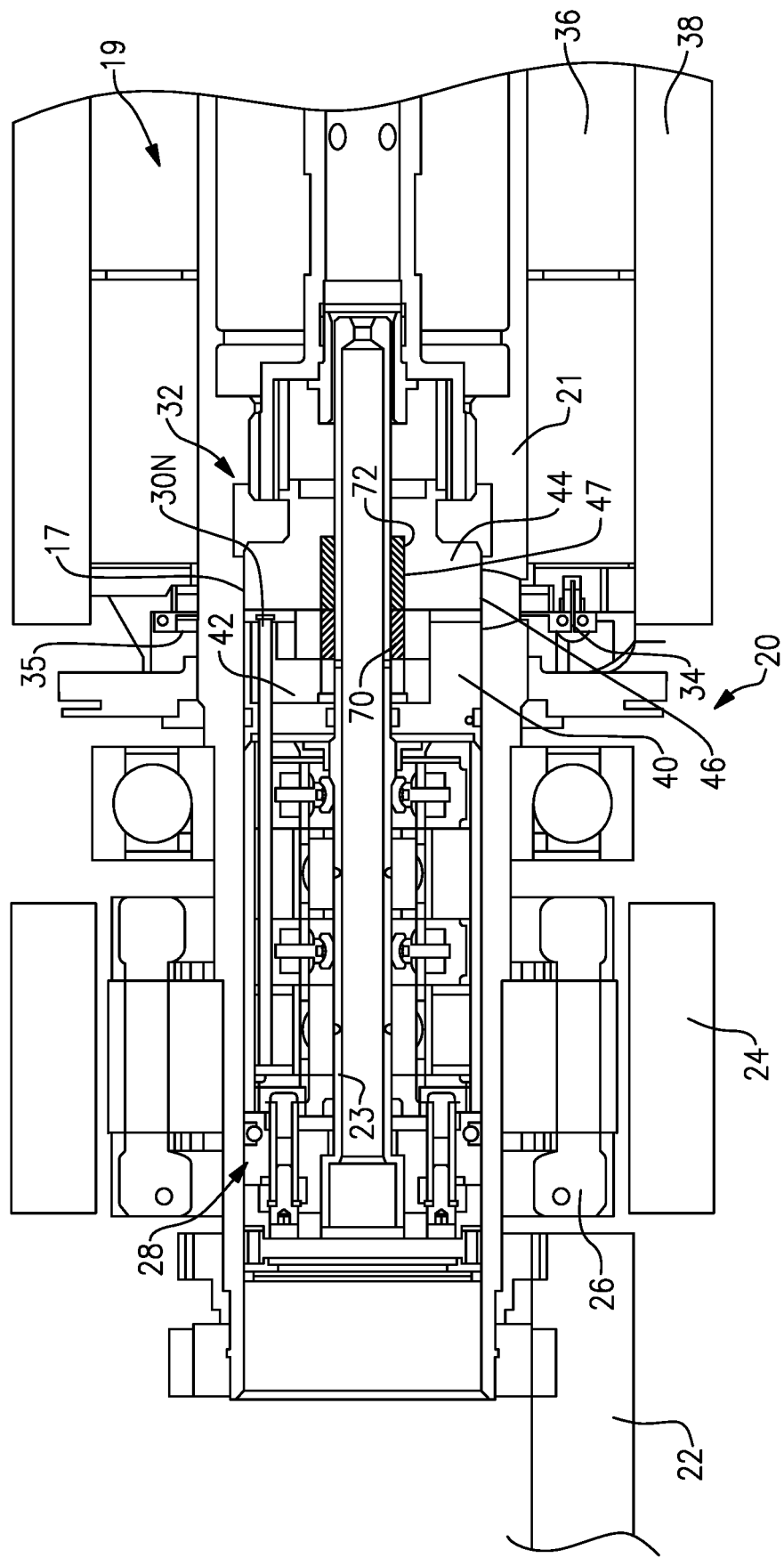
FIG. 1 shows a high speed generator.

FIG. 1 shows a high speed generator 20 receiving an input 22. Input 22 may be a shaft driven by a turbine in an associated gas turbine engine such as found on an aircraft. The input 22 drives a shaft 21 and another shaft 23.

An exciter stator 24 surrounds an exciter rotor 26. A rectifier assembly 28 rotates with the exciter rotor 26 and the shafts 21 and 23. A negative bus 30N is illustrated extending from the rectifier assembly 28. It should be understood that a positive bus also extends from the rectifier assembly 28, but would not be visible in this view.

Figure 2:
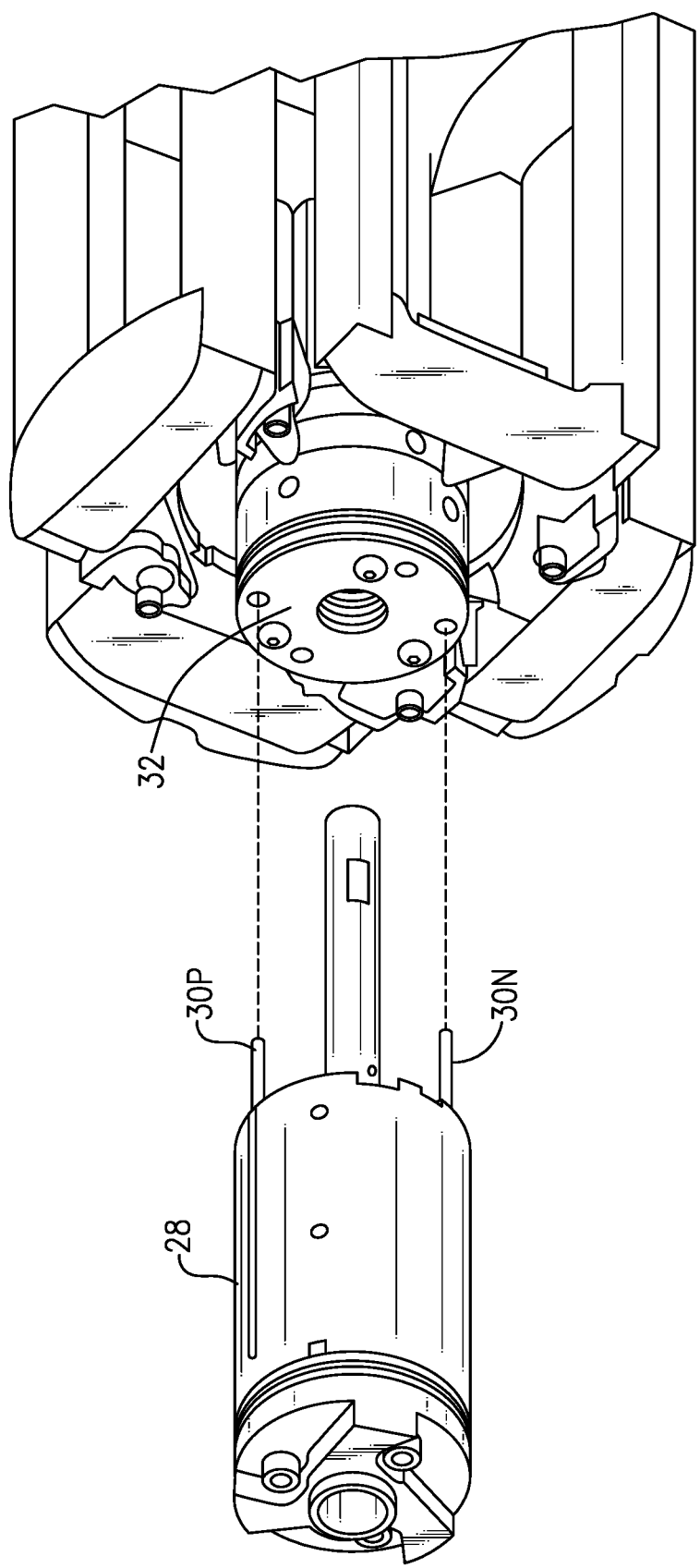
FIG. 2 shows a connection of a rectifier assembly to a connection assembly.

FIG. 2 shows the rectifier pack 28 having positive and negative busses 30P and 30N extending toward connection assembly 32.

The operation of the structure to this point may generally be as known.

Returning to FIG. 1, the connection assembly 32 includes an insulator 40 formed of a plastic, a positive rail 42, which receives the bus 30P, and negative rail 44 which receiver bus 30N. Positive rail 42 and negative rail 44 are each formed of aluminum. The negative rail 44 has a bore 47. An outer surface 46 of negative rail is in contact with an inner surface 17 of shaft 21 to provide a ground connection. This allows the elimination of the prior impedance resistor. Instead, the negative rail 44 makes a direct ground connection.

Connections or terminals 35 and 34 are shown that communicate the negative and positive rails to the main field winding 36.

In practice, three phase AC current is supplied from the exciter stator 24 to the exciter rotor 26. That three phase AC current is rectified to DC by the rectifier assembly 28 and supplied to the connection assembly 32. Then, from the connection assembly 32 the positive and negative connections 34 and 35 are connected to the main field winding 36. Main stator 38 is also shown.

The shafts 21 and 23, rectifier assembly 28, connection assembly 32, main field winding 36 and associated connection components could be called a rotor pack 19. As mentioned above, during operation, the input 22 causes the rotor pack 19 to rotate and electric power is generated at the main stator 38.

Spring 72, formed of metal sits in bore 47 and thus provide an electric connection to negative rail 44. Spring also biases ceramic suppression register into positive rail 42.

Figure 3:
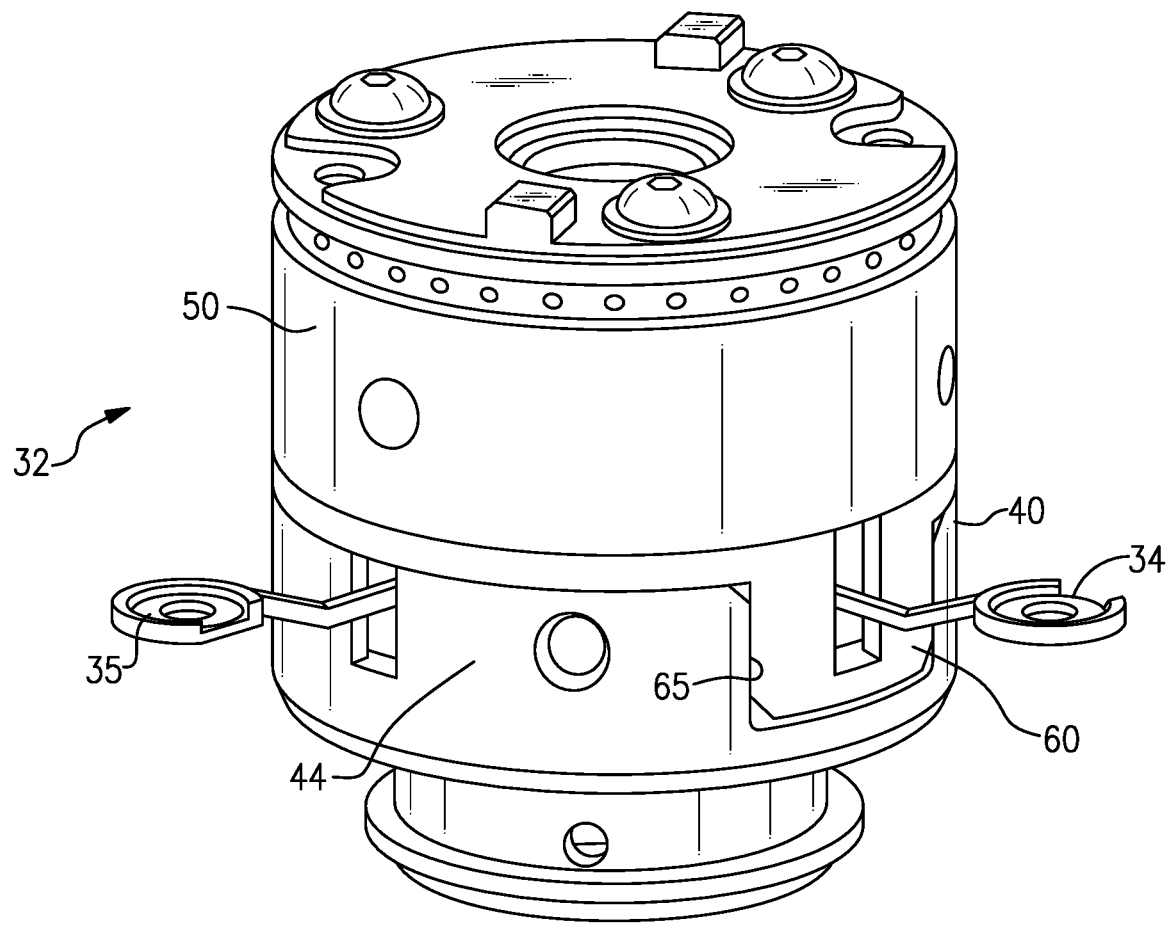
FIG. 3 shows a connection assembly.

FIG. 3 shows the connections 34 and 35 extending from the connection assembly 32. Cover 50 is shown as well as insulator 40 and negative rail 44. Insulator 40 is shown to have a plug 60 extending into a slot 65 on the negative rail 44.

Figure 4:
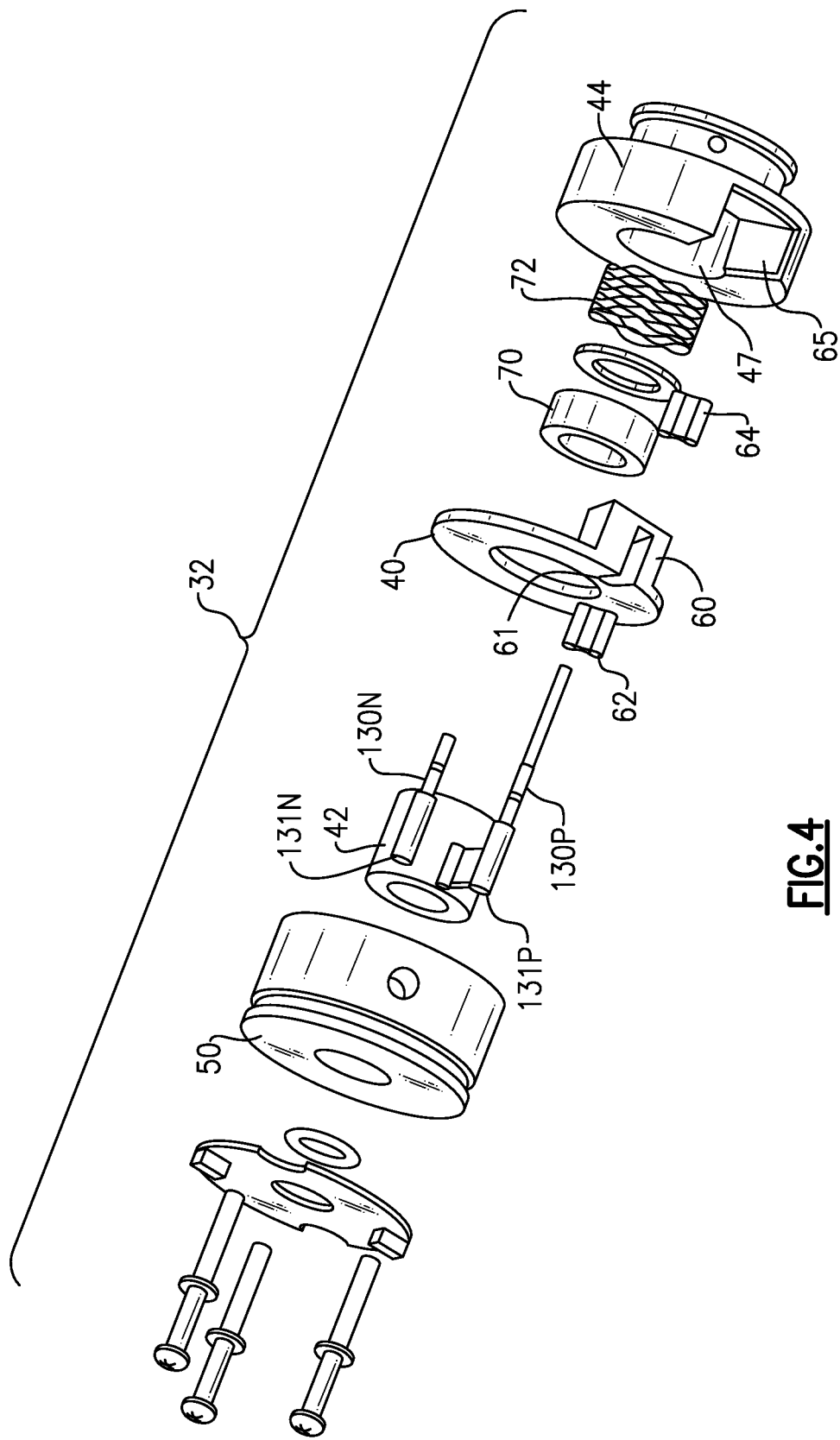
FIG. 4 is an exploded view of the connection assembly.

FIG. 4 is an exploded view of the several components. FIG. 4 also shows pin connection 130N and 130P which receive the busses 30P and 30N from the rectifier assembly 28. Spring clip 62 is associated with pin 130P and received within a pocket 61 in the plug 60 of insulator 40. A spring clip 64 will receive the negative pin 130N and be received in another pocket in the negative rail 44. Ceramic suppression resistor 70 is shown as is retention spring 72. As mentioned, retention spring 72 biases the resistor against both positive rail 42 and negative rail 44.

The spring clips 62 and 64 are formed copper springs. They sit compressed within pockets such that they flex outward in the pockets maintaining a positive lock against their respective housings.

Figure 5:
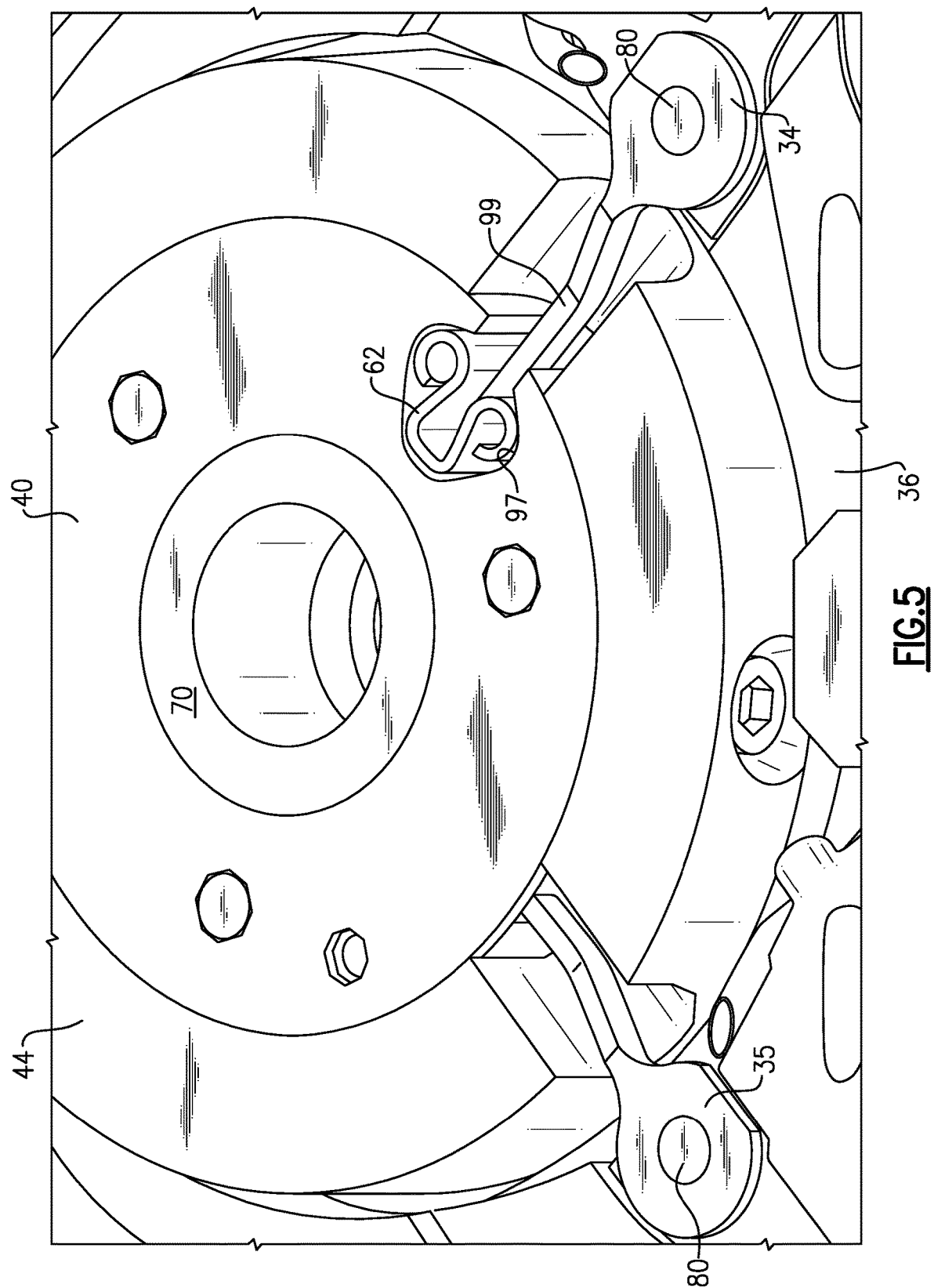
FIG. 5 is a cross-sectional view.

FIG. 5 shows the connection 34 pinned at 80 to the main filed winding 36. Further, the connector 34 has a tang 99 received in spring clip 62. Spring clip 62 sit compressed in a pocket 97 in the insulator 40.

Figure 6:
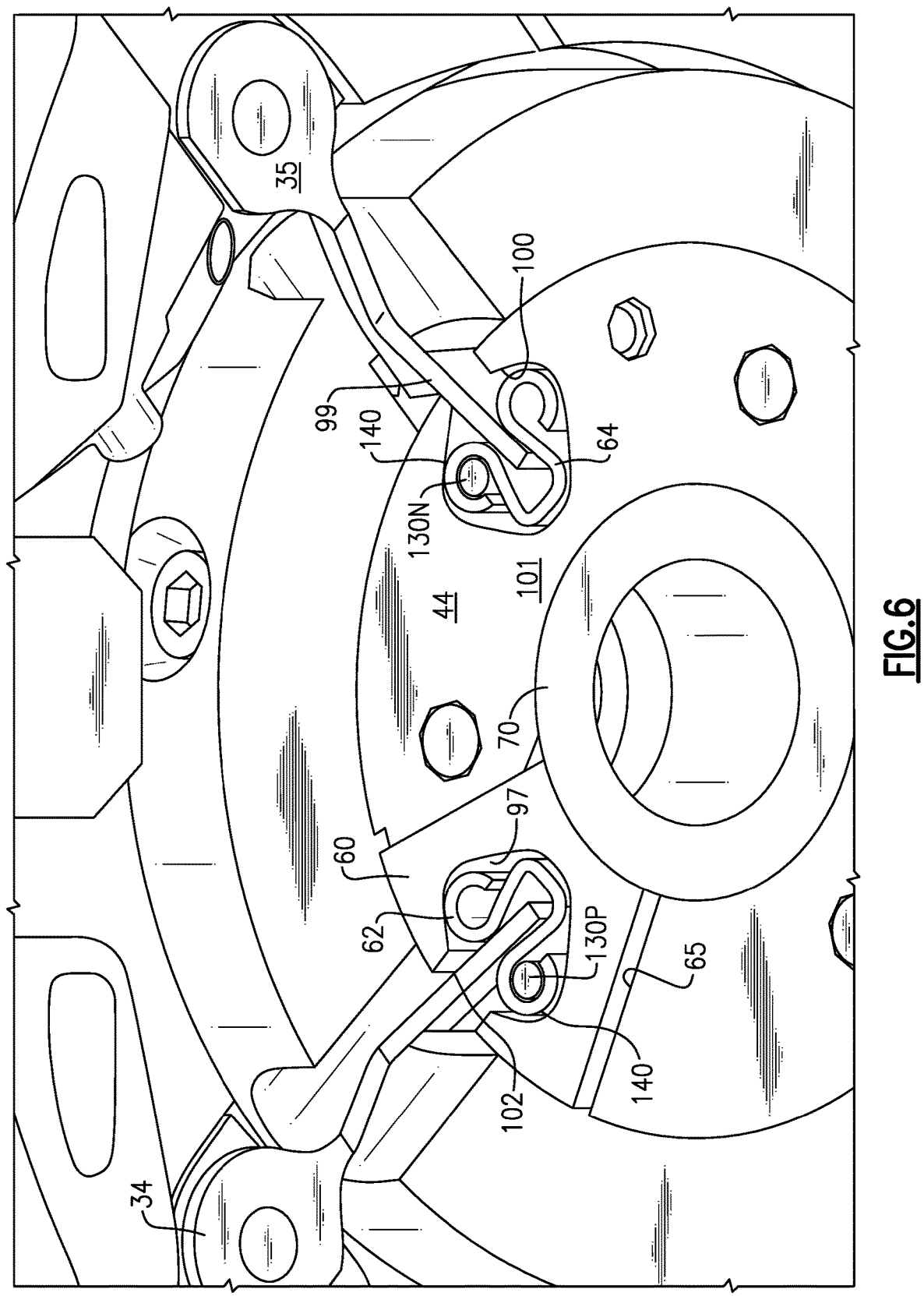
FIG. 6 shows a distinct cross-section through the connector pack.

FIG. 6 shows the plug 60 receiving spring clip 62 and connector 34, tang 99. Spring clip 64 is also disposed in the pocket 100 formed in a forward face 101 of the negative rail 44.

Since the spring clip 64 is received within pocket 100 formed in a metal member, the spring clip is not likely to deform pocket 100. The pocket in the prior art was formed in a plastic member, which could deform thereby reducing the compressed force holding the spring clip against tang 99 of the connection 35.

As shown, the connection pin 130P extends into one loop 140 of the spring clip 62 to communicate the positive connection to the spring clip and then to tang 99 of the connector 34. The connection pin 130N is also shown in a spring half 140.

A rotor pack 19 for a generator 20 includes an exciter rotor 26 rotating with a shaft 21. A rectifier assembly 28 in an electric communication with the exciter rotor 26 to receive AC current and rectify the AC current into a DC voltage. Connection busses 30P/30N extend from the rectifier assembly 28 with a negative bus 30N extending into a negative rail 44 on a connection assembly 32. A positive bus 30P connects into a positive rail 42 on the connection assembly 32. The negative rail 44 is in contact with the shaft 21 to provide a ground connection for the negative rail. The negative and positive rails 42/44 are formed of a metal. The negative and positive rails 42/44 connect to a main field winding 36.

The negative bus 30N extends into a negative pin 130N. The negative pin 130N is connected to provide a negative connection to a spring clip 64 received in a pocket 100 in the negative rail 44. A negative electric connector 35 extends radially outwardly from the negative rail 44 to provide a negative connection to the main field winding 36.

The negative spring clip 64 includes a pair of loops 140 with the negative pin 130N extending into one of the loops and the negative connection 35/99 is received between the loops. The loops 140 are biased toward each other and against the negative connection 35/99 when received in the pocket 100.

The negative rail 44 includes a groove 65 receiving a plug 60 from an insulator 40, and a positive spring clip 62 is received within a pocket 47 in the insulator plug.

The positive spring clip 62 includes a pair of loops 140 with the positive pin 130P extending into one of the loops and the positive connection 34/99 being received between the loops 140. The loops are biased toward each other and against the positive connection when received in the pocket 97.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A rotor pack for a generator comprising:
an exciter rotor rotating with a shaft;
a rectifier assembly in electric communication with said exciter rotor to receive AC current and rectify the AC current into a DC voltage, a positive bus and a negative bus extending from said rectifier assembly, with said negative bus extending into a negative rail on a connection assembly, and said positive bus connecting into a positive rail on said connection assembly, said negative rail is in contact with said shaft to provide a ground connection for said negative rail, said negative and positive rails are formed of a metal;
said negative and positive rails connected to a main field winding;

wherein said positive bus is connected to a positive pin in said connection assembly, said positive pin is connected to provide a connection to a positive spring clip received in a pocket in an insulator, and a positive electric connection connected to said positive spring clip, said positive electric connection extending radially outwardly from said positive spring clip to provide a positive connection to said main field; and
wherein said negative rail including a groove receiving a plug from said insulator, and said positive spring clip received within a pocket in said plug.

2. The rotor pack as set forth in claim 1, wherein said positive rail and said negative rail are formed of aluminium.

3. The rotor pack as set forth in claim 1, wherein said negative bus is connected to a negative pin in said connection assembly, said negative pin is connected to provide a connection to a negative spring clip received in a pocket in said negative rail, and a negative electric connection extending radially outwardly from said negative rail to provide a negative connection to said main field winding, said negative spring clip includes a pair of loops with said negative pin extending into one of said loops and said negative electric connection being received between said loops, said loops biased toward each other and against said negative electric connection when received in said pocket.

4. The rotor pack as set forth in claim 3, wherein said positive bus is connected to a positive pin in said connection assembly, said positive pin is connected to provide a connection to a positive spring clip received in a pocket in an insulator, and a positive electric connection connected to said positive spring clip, said positive electric connection extending radially outwardly from said positive spring clip to provide a positive connection to said main field.

5. The rotor pack as set forth in claim 4, wherein said negative rail including a groove receiving a plug from said insulator, and said positive spring clip received within a pocket in said plug.

6. The rotor pack as set forth in claim 5, wherein a ceramic suppression resistor is biased against said positive rail, a bias force on said ceramic suppression resistor is provided by a metal retention spring received in a bore in said negative rail, and in contact with said negative rail.

7. The rotor pack as set forth in claim 1, wherein a ceramic suppression resistor is biased against said positive rail and a bias force on said ceramic suppression register is provided by a metal retention spring received in a bore in said negative rail, and in contact with said negative rail.

8. A rotor pack for a generator comprising:
an exciter rotor rotating with a shaft;
a rectifier assembly in electric communication with said exciter rotor to receive AC current and rectify the AC current into a DC voltage, a positive bus and a negative bus extending from said rectifier assembly, with said negative bus extending into a negative rail on a connection assembly, and said positive bus connecting into a positive rail on said connection assembly, said negative and positive rails are formed of a metal;
said negative and positive rails connected to a main field winding; and
said negative bus is connected to a negative pin in said connection assembly, said negative pin is connected to provide a connection to a negative spring clip received in a pocket in said negative rail, and a negative electric connection extending radially outwardly from said negative rail to provide a negative connection to said main field winding.

9. The rotor pack set forth in claim 8, wherein said positive bus is connected to a positive pin in said connection assembly, said positive pin is connected to provide a connection to a positive spring clip received in a pocket in an insulator, and a positive electric connection connected to said positive spring clip, said positive electric connection extending radially outwardly from said positive spring clip to provide a positive connection to said main field.

10. The rotor pack as set forth in claim 9, wherein said negative rail including a groove receiving a plug from said insulator, and said positive spring clip received within a pocket in said plug.

11. The rotor pack as set forth in claim 8, wherein said positive rail and said negative rail are formed of aluminium.

12. The rotor pack as set forth in claim 11, said negative spring clip includes a pair of loops with said negative pin extending into one of said loops and said negative electric connection being received between said loops, said loops biased toward each other and against said negative electric connection when received in said pocket.

13. A high speed generator comprising:
an exciter stator surrounding an exciter rotor and a main stator surrounding a main field winding;
said exciter rotor rotating with a shaft;
a rectifier assembly in electric communication with said exciter rotor to receive AC current and rectify the AC current into a DC voltage, a positive bus and a negative bus extending from said rectifier assembly, with said negative bus extending into a negative rail on a connection assembly, and said positive bus connecting into a positive rail on said connection assembly, said negative rail is in contact with said shaft to provide a ground connection for said negative rail, said negative and positive rails are formed of a metal;
said negative and positive rails connected to said main field winding;
wherein a ceramic suppression resistor is biased against said positive rail; and
wherein a bias force on said ceramic suppression resistor is provided by a metal retention spring received in a bore in said negative rail, and in contact within said negative rail.

14. The high speed generator as set forth in claim 13, wherein said positive rail and said negative rail are formed of aluminium.

15. The high speed generator as set forth in claim 14, wherein said negative bus is connected to a negative pin in said connection assembly, said negative pin is connected to provide a connection to a negative spring clip received in a pocket in said negative rail, and a negative electric connection extending radially outwardly from said negative rail to provide a negative connection to said main field winding.

16. The high speed generator as set forth in claim 15, wherein said negative spring clip includes a pair of loops with said negative pin extending into one of said loops and said negative electric connection being received between said loops, said loops biased toward each other and against said negative electric connection when received in said pocket.

17. The high speed generator as set forth in claim 16, wherein said positive bus is connected to a positive pin in said connection assembly, said positive pin is connected to provide a connection to a positive spring clip received in a pocket in an insulator, and a positive electric connection connected to said positive spring clip, said positive electric connection extending radially outwardly from said positive spring clip to provide a positive connection to said main field.

18. The high speed generator as set forth in claim 17, wherein said negative rail including a groove receiving a plug from said insulator, and said positive spring clip received within a pocket in said plug.

\* \* \* \* \*